United States Patent Office 3,116,219
Patented Dec. 31, 1963

3,116,219
MICROBIOLOGICAL 16α-HYDROXYLATION OF STEROIDS
Louis M. Pruess, Pearl River, and Louis I. Feldman, Spring Valley, N.Y., and Neil E. Rigler, Ridgewood, N.J., assignors to American Cyanamid Company, New York, N.Y., a corporation of Maine
No Drawing. Filed Aug. 21, 1961, Ser. No. 132,598
1 Claim. (Cl. 195—51)

This invention relates to hydroxylation of steroids. More particularly, it is concerned with a novel method of introducing hydroxyl groups into the 16-position in certain useful steroids of the pregnene series by means of microbiological fermentation. It also deals with the hydroxylated product.

The desirable attributes of the 16-oxygen in steroids demonstrating anti-inflammatory activity such as triamcinolone is well established. A number of such steroids of the pregnene and pregnadiene series are becoming increasingly important, either as therapeutic agents or as intermediates in the preparation of other therapeutically useful steroids. Such compounds have been found useful, for example, as anti-inflammatory agents in the treatment of arthritis, asthma, burns, bursitis, and the like, and also in the treatment of skin disorders and collagen diseases. As such, these compounds are used in combination with fillers, excipients, etc., in tablets, powders, pills, etc. They can also be used parenterally in a solution or in a suspension.

As indicated above, many of these steroids contain a hydroxyl group in the 16-position. According to the present invention, it has been found that this group can be introduced by fermentation in the presence of certain micro-organisms of the genus Streptomyces which have been found to have previously unsuspected utility for this purpose. Those micro-organisms which comprise the group found useful according to the present invention will be set forth in more detail below.

Typical of the class of steroids which can be usefully processed according to the present invention include, for example: 4-androstene-3,17-dione, 4-pregnene-3,20-dione, 4-pregnene-21-ol-3,20-dione, 4-pregnene-17α,21-diol-3,20-dione, 4-pregnene-11β,17α,21-triol-3,20-dione, 9α-fluoro-4-pregnene-11β,17α,21-triol-3,20-dione, and 1,4-pregnadiene-11β,17α,21-triol-3,20-dione. The invention is also applicable to certain esters of these steroids, such as the acetate and the like.

In general, reaction obtained according to the present invention may be illustrated, for example, by the following equation:

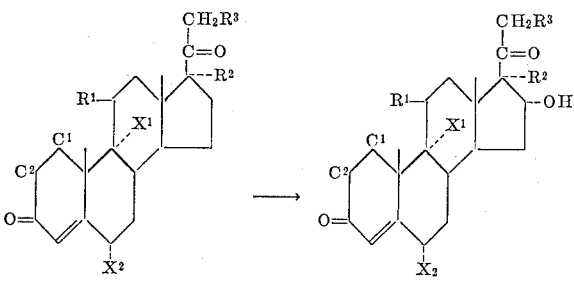

wherein $X^1$ and $X^2$ are hydrogen or halogen; $R^1$, $R^2$ and $R^3$ may be hydrogen or hydroxyl or $R^3$ may be an ester grouping such as the acetoxy group; and

is a divalent radical of the group consisting of —CH₂—CH₂— and —CH=CH—. When the starting material is an ester, such as the 21-acetate, the acyl group also will be hydrolyzed as shown, for example, by the following illustration.

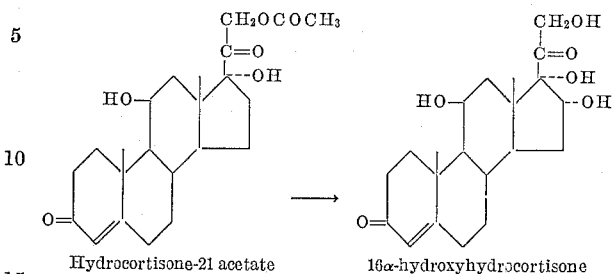

Hydrocortisone-21 acetate     16α-hydroxyhydrocortisone

When it is desirable that an ester, such as the 21-acetate or the like, comprise the final product, it may be readily prepared from the reaction product by known methods. This may be done, for example, by reacting the product with an esterifying agent, such as acetic anhydride, or the like, in a suitable solvent such as pyridine or the like.

In carrying out the process of the present invention, the suitable organism is cultivated aerobically in a suitable nutrient medium with the steroid which is to be hydroxylated. During the growth of the organism under favorable conditions, the desired hydroxyl group is introduced into the steroid ring structure. The exact mechanism by which this hydroxylation is accomplished is not wholly certain. It is known to be caused by enzymes produced by the organism in the process of growth.

In accordance with the present invention, suitable organisms of the genus Streptomyces which have the unexpected property of producing the desired result are as follows:

*Table I*

| (Lederle No.) | No. | Binomial Name | Origin of Culture |
|---|---|---|---|
| A-3164 | 1 | S. aureus | ATCC 3309.[1] |
| AA-366 | 2 | S. fimicarius | CBS (Baarn Coll.).[2] |
| AD-1431 | 3 | S. griseolus | Soil Isolate. |
| A-3163 | 4 | S. lipmanii | ATCC 3331. |
| A-3169 | 5 | S. microflavus | ATCC 3332. |
| A-1 | 6 | S. griseus | Waksman, Rutgers. |
| A-100 | 7 | S. griseus, var. cinnabarinus. | Soil Isolate. |
| RA-3878 | 8 | S. griseus, var. castaneous | Do. |
| RA-7688 | 9 | S. griseus, var. violaceus | Do. |
| A-3155 | 10 | S. purpeochromogenus | ATCC 3313. |
| AD-513 | 11 | S. willmorei | NRRL-B-1332.[3] |

[1] American Type Culture Collection.
[2] Centraalbureau voor Schimmelcultures—Baarn.
[3] Northern Regional Research Laboratories.

A suitable nutrient medium contains a soluble source of carbon, nitrogen, and mineral elements. In general, preparation of such media is well known and the practice of the present invention in this respect may follow such procedures. An illustrative example of a suitable medium of this type is one which contains the following: 1% glucose, 0.3% cornsteep liquor, 0.22% soybean meal, 0.25% yeast extract, 0.3% sodium phosphate and 0.25% $CaCO_3$; the whole being adjusted to about pH 7 with 10-normal sodium hydroxide. This medium is used in the illustrative examples below.

In an illustrative preparation of inoculum, about one ml. of cell suspension as washed with about six ml. of aqueous sterile salt solution (0.9%) from a suitable culture, as on potato dextrose agar, yeast extract agar or the like, is used to inoculate about 100 ml. of sterile medium in a 500 ml. Erlenmeyer flask.

Inoculated medium then is incubated at about 25°–30° C., usually averaging about 28° C., on a shaker for an initial pregrowth period of some 16 to 24 hours. Thereafter the steroid is added, usually about 40 mg. in about 2 ml. of methanol, and incubation is continued until harvest, usually some 24–144 hours after adding the steroid. This procedure is used below in the illustrative examples.

A number of alternatives for the several steps may be used, for example, use of a pregrown vegetative inoculum instead of the washed slant suspension. Other media, media volumes, incubation periods, and temperatures may be used. Instead of adding the steroid to the inocula the latter may be used to inoculate other flasks for steroid conversion or larger batches of medium in seed bottles. Such bottle cultures, after further incubation, usually under conditions of aeration and stirring may be used for steroid conversion or to inoculate large batches of medium in aerated, stirred fermenter tanks.

A good typical practice in fermenter tank procedure is illustrated in the following method. Medium is prepared in the tank, sterilized by heating and cooled to the temperature of the inoculant. The medium is then inoculated with from about one to about six percent of a vegetative inoculum prepared as above. The broth is then agitated with a stirrer at from about 100 to about 500 r.p.m., and aerated at the rate of about 0.5 to about 1.5 volumes of air per volume of broth. The actual values used will vary within the approximate ranges shown, depending upon the volume, the shape of the tank, the stirrer and the like.

The inoculated tank is then maintained at the desired temperature, in the illustrative case about 27° C., until the organism growth reaches about 0.3 g. per 100 ml. or more. The steroid substrate is then added, usually dissolved in methanol. Agitation and aeration are continued until the substrate disappears. The culture broth is then harvested and the hydroxylated product isolated. Conversions of the added substrates of some ten percent to substantially complete are readily produced.

The amount of steroid added as substrate to the fermentation may be varied as necessary or desirable. However, a good practice will ordinarily be to add on the order of about 0.05 to about 1.0 gram per liter of nutrient medium.

When using such steroid substrates in the fermentation, the products formed are the free steroids. The steroid substrates are generally added to the fermentation in solution or in finely-divided form. A preferred method is to dissolve the steroid in methanol or some other water-miscible solvent and to add it to the fermentation medium at the desired stage in the process. Although the steroid may precipitate from solution when so added, it is dispersed throughout the medium as a fine suspension and becomes readily available to the organism for oxidation.

During fermentation, it is frequently found desirable to add an antifoaming agent. In such cases, commercially-available products may be used. These usually contain such agents as silicones, glyceride oils, and the like. These compounds are added from time to time and in the amounts needed. Their use is not necessarily a feature of the invention.

The present invention will be more fully described in conjunction with the following examples which are intended as illustrative only. In the various tables therein the culture numbers are those of Table I, above.

EXAMPLE 1

*16α-Hydroxylation of 4-pregene-11β-17α-21-triol-3,20-dione (hydrocortisone)*

A test tube slant of *S. aureus* (ATCC 3309) previously grown on yeast extract agar is washed with six ml. of sterile 0.9% NaCl solution. One ml. of the resulting suspension is used to inoculate 100 ml. of sterile nutrient medium in a 500 ml. Erlenmeyer flask and the mixture is incubated on a reciprocating shaker at about 28° C. for about 17 hours. At this time, the substrate in the form of a methanol solution (40 mg./2 ml.) is added and incubation is continued under the same conditions for an additional 72 hours. The fermentation beer is harvested and extracted with three volumes of ethyl acetate. The extract is concentrated to a residue under vacuum, dissolved in a methanol-dimethylformamide mixture and the 16α-hydroxylation unequivocally confirmed by a combination of chromatographic and electrophoretic techniques, using a known sample of 16α-hydroxyhydrocortisone as a reference.

EXAMPLES 2–9

Repetition of the procedure of Example 1 on the same substrate, but substituting for the *S. aureus* the different organisms and using the harvest periods indicated in the following Table II, the same product is obtained.

TABLE II

| Example Number | Culture Number | Harvest (hours) |
|---|---|---|
| 2 | 1 | 24 |
| 3 | 2 | 24 |
| 4 | 4 | 24 |
| 5 | 5 | 90 |
| 6 | 8 | 90 |
| 7 | 9 | 90 |
| 8 | 10 | 72 |
| 9 | 11 | 90 |

In each case the same 16α-hydroxy derivative is obtained as in Example 1.

EXAMPLES 10–18

*16α-Hydroxylation of 4-Pregnene-3,20-Dione (Progesterone)*

Using the same prefermentation, fermentation, isolation and identification procedures of Example 1 on progesterone as the substrate, the organisms and harvest times shown in the following Table III are used.

TABLE III

| Example Number | Culture Number | Harvest (hours) |
|---|---|---|
| 10 | 1 | 24 |
| 11 | 2 | 24 |
| 12 | 3 | 90 and 121 |
| 13 | 4 | 24 |
| 14 | 6 | 24 |
| 15 | 7 | 90 and 121 |
| 16 | 8 | 24 |
| 17 | 9 | 24 |
| 18 | 10 | 72 |

In each case 16α-hydroxylated progesterone is obtained.

EXAMPLES 19–27

*16α-Hydroxylation of 4-Pregnene-21-ol-3,20-Dione (DOC)*

A procedure which differed from Example 1 only in the substrate an harvest times is carried out on DOC. The organisms and times are shown below in Table IV.

TABLE IV

| Example Number | Culture Number | Harvest (hours) |
|---|---|---|
| 19 | 1 | 72 |
| 20 | 2 | 72 |
| 21 | 3 | 90 and 121 |
| 22 | 4 | 24 |
| 23 | 6 | 24 |
| 24 | 7 | 90 and 121 |
| 25 | 8 | 72 |
| 26 | 9 | 144 |
| 27 | 10 | 72 |

In each case the product 16α-hydroxy DOC is obtained.

EXAMPLES 28–36

*16α-Hydroxylation of 4-Pregnene-17α,21-Diol-3,20-Dione*

The procedure of Example 1 is again repeated on a different substrate (Reichstein's Substance S) using the organisms and harvest times shown in the following Table V.

TABLE V

| Example Number | Culture Number | Harvest (hours) |
|---|---|---|
| 28 | 1 | 144 |
| 29 | 2 | 144 |
| 30 | 3 | 90 and 121 |
| 31 | 4 | 72 |
| 32 | 6 | 144 |
| 33 | 7 | 90 and 121 |
| 34 | 8 | 144 |
| 35 | 9 | 144 |
| 36 | 10 | 72 |

In each case the 16α-hydroxylated derivative is obtained.

EXAMPLES 37–42

*16α-Hydroxylation of 1,4-Pregnadiene-11β,17α,21-Triol-3,20-Dione*

Again the procedure of Example 1 is repeated on a different substrate (prednisolone) using the organisms and harvest times shown in Table VI. One additional distinction is that in Examples 37, 39, 41 and 42 the substrate is added at zero time and in Examples 38 and 40 after 24 hours, rather than after 17 hours as in Example 1.

TABLE VI

| Example Number | Culture Number | Harvest (hours) |
|---|---|---|
| 37 | 1 | 86 |
| 38 | 3 | 90 and 121 |
| 39 | 6 | 96 |
| 40 | 7 | 90 and 121 |
| 41 | 8 | 96 |
| 42 | 9 | 48 |

In each case the 16α-hydroxy derivative is obtained.

EXAMPLES 43–49

*16α-Hydroxylation of 9α-Fluoro-4-Pregnene-11β,17α,21-Triol-3,20-Dione (FF)*

Example 37 is repeated on a different substrate (FF) using the cultures and harvest times of the following Table VII.

TABLE VII

| Example Number | Culture Number | Harvest (hours) |
|---|---|---|
| 43 | 1 | 96 |
| 44 | 2 | 96 |
| 45 | 3 | 90 |
| 46 | 4 | 96 |
| 47 | 5 | 90 |
| 48 | 10 | 96 |
| 49 | 11 | 90 |

In each case the 16α-hydroxy derivative is obtained.

EXAMPLES 50–53

Using the same substrate as in Example 43, that example is repeated except for the isolation procedure and the use of the organisms and harvest times shown in the following Table VIII.

TABLE VIII

| Example Number | Culture Number | Harvest (hours) |
|---|---|---|
| 50 | 6 | 96 |
| 51 | 7 | 90 |
| 52 | 8 | 96 |
| 53 | 9 | 96 |

In the isolation procedure, 540 ml. of mash (originally containing 115 mg. of 9α-fluoro-4-pregnene-11β,17α,21-triol-3,20-dione) is filtered, using filter-aid, and the filter cake washed with 50 ml. of water. The filtrate is then extracted two times with 540 ml. portions of ethyl acetate. The combined extracts are washed with 50 ml. of water, then dried by the addition of 10 gm. of anhydrous sodium sulfate, and finally treated with 200 mg. of activated carbon. The treated extract is then concentrated to dryness and chromatographed using a partition column, and solvent system water-dioxane-cyclohexane (1–5–2 volumes, respectively). The fraction obtained from the chromatographic column is assayed, indicating yields of about 68%, based upon the starting material. The fraction is taken to dryness under vacuum, washed with ether and recrystallized from acetone. The identity of the crystal product obtained is confirmed by comparison with a known sample as to the melting point, mixed melting point, infrared spectrum, partition chromatography and paper chromatography.

The several streptomyces discussed herein are believed to be strains of known species. They fall into different groups for purposes of this application. These groups are set forth below. Therein for purposes of simplification the culture members assigned above in Table I for purposes of reference are used. Under the column headed "Reference" are listed page numbers. All page numbers are those from Bergey's Manual of Determinative Bacteriology, 7th edition, Baltimore, 1957, Williams and Wilkens Company. These groups may be tabulated as follows:

*Group I.*—Strains which were previously determined and obtained from available sources. Seven cultures are in this group. They are:

| Culture No. | Source | Reference |
|---|---|---|
| 1 | ATCC–3309 | p. 778. |
| 2 | CBS | pp. 768–9. |
| 4 | ATCC–3331 | p. 796. |
| 5 | ATCC–3332 | p. 792. |
| 6 | Rutgers | p. 791. |
| 10 | ATCC–3313 | pp. 777–8. |
| 11 | NRRL–B–1332 | pp. 820–1. |

*Group II.*—Soil isolates which (when determined) conform to previously-determined species. Only one culture falls in this group. It is:

Culture No. _____ 3
Reference _____ p. 766

*Group III.*—Soil isolates wihch are believed to be new and novel. They have certain basic characteristics which resemble *S. griseus* (Krainsky) Waksman and Henrici, i.e., number "6" of Table I (supra). The sample thereof was received from the Rutgers Institute of Microbiology. These new cultures have been given the same general designation as No. "6," but are further distinguished from it and from each other by proposed varietal designations. There are three cultures in this group. They are:

Culture No.                             Designation
7 _____ var. *cinnibarinus*.
8 _____ var. *castaneous*.
9 _____ var. *violascens*.

These varietal designations were chosen to be representative of certain color peculiarities in the colony reverses and soluble pigments of the cultures when grown on various agar media. More specific descriptions follow, wherein the color designations are made in accord with Ridgway, "Color Standards and Nomenclature" (1912), Washington, D.C.

*Streptomyces griseus* (Krainsky) Waksman and Henrici var. *cinnabarinus* var. nov.:

Amount of growth—Moderate to good on most media; very good on yeast-malt agar; thin and spreading on corn steep liquor agar. Colonies compact on most media.

Aerial mycelium and/or spore color—Aerial mycelium varying in color on the different media from white to pinkish shades. En masse spore color olive-buff to tea green. Sporulation moderate to good on many media; absent only on asparagin dextrose meat extract, nutrient agar, Waksman's glucose and Sabouraud's maltose.

Soluble pigments—Soluble pigments produced on most media in yellowish to pinkish shades.

Reverse colors—Reverse in some shade of red generally.

Miscellaneous physiological reactions—Partial liquefaction of gelatin; slight peptonization and coagulation of purple milk; negative $H_2S$ reaction on peptone-iron agar.

Morphology—Sporiferous appendages long, flexuous and entangled. Spores mostly elongate, occasionally globose, 0.6 x 1.2–1.3a.

Temperature relations—Temperature range 10° C. to 32° C.; optimum for growth and sporulation 24° C. to 28° C.

General—Culture produces very sharp penetrating odor on most media.

*Streptomyces griseus* (Krainsky) Waksman and Henrici var. *castaneous* var. nov.:

Amount of growth—Growth moderate to good on most media; spreading on Czapek's, potato-dextrose, corn steep liquor and Czapek's mannitol agars; restricted on Benedict's agar.

Aerial mycelium and/or spore color—Aerial mycelium white. En masse sporulation in olive-buff shades, moderate to good on most media; absent only on Benedict's, Emerson's, Waksman's glucose and cobalt-Amidex agars.

Soluble pigments—Soluble pigments generally absent but appearing in pink to vinaceous shades on Waksman's starch, calcium malate, Bennett's and yeast malt agars; brownish on Sabouraud's maltose agar.

Reverse color—Reverse coloration varying from yellowish on some media to cinnamon or brownish on others.

Miscellaneous physiological reactions—Partial liquefaction of gelatin; slight peptonization and coagulation of purple milk; positive $H_2S$ reaction on peptone-iron agar.

Morphology—Sporiferous appendages up to 50 or 75 mm. long. Straight to flexuous; commonly tufted. Spores mostly elongate, occasionally globose, 0.6 x 1.0–1.2a.

Temperature range—Temperature range <10° C.–37° C. Optimum for growth and sporulation 24° C.

*Streptomyces griseus* (Krainsky) Waksman and Henrici var. *violascens* var. nov.:

Amount of growth—Growth moderate to good on all media; spreading on Czapek's, Emerson's, potato-dextrose, Bennett's, corn steep liquor, Sabouraud's maltose, and Czapek's mannitol agars; somewhat restricted on cobalt-Amidex, calcium malate and Benedict's agars.

Aerial mycelium and/or spore color—Aerial mycelium mostly white with spore masses in shades of olive-buff to water green. Sporulation moderate to good or heavy on most media; poor on cobalt-Amidex, Czapek's, nutrient, calcium malate and corn steep liquor agars.

Soluble pigments—Soluble pigments prominent on most media; usually in bluish, violet, purple or vinaceous shades.

Reverse color—Colony reverse is generally in shades similar to the soluble pigment, i.e., bluish, violet, etc.

Miscellaneous physiological reactions—Partial liquefaction of gelatin; light peptonization and coagulation of milk; positive $H_2S$ reaction on peptone-iron agar.

Morphology—Sporiferous appendages straight to flexuous; commonly tufted; mostly 75–100 mm. long. Spores mostly globose, 0.8–1.0a.

Temperature relations—Temperature range <10° C.–37° C. Optimum for growth and sporulation 24° C.

In the following claim, the terms "group I," "group II" and "group III" or "groups I, II and III" are used for simplification. As used in the claims they include but are limited to the specific members recited in each (above).

We claim:

A method of 16α-hydroxylating 9α-fluoro-4-pregnene-11β,17α,21-triol-3,20-dione which comprises subjecting said steroid to the fermentative action of a 16α-hydroxylating organism selected from the group consisting of *Streptomyces aureus*, *S. fimicarius*, *S. griseolus*, *S. griseus*, *S. griseus* var. *cinnabarinus*, *S. griseus* var. *castaneous*, *S. griseus* var. *violaceus*, *S. lipmanii*, *S. microflavus*, *S. purpeochromogenus* and *S. willmorei*, and recovering the corresponding 16α-hydroxylated steroid therefrom.

References Cited in the file of this patent

UNITED STATES PATENTS

| | | |
|---|---|---|
| 2,838,544 | Babcock et al. | June 10, 1958 |
| 2,838,547 | Magerlein et al. | June 10, 1958 |
| 2,844,513 | Wettstein et al. | July 22, 1958 |
| 2,855,410 | Fried et al. | Oct. 7, 1958 |